Patented Feb. 20, 1934

1,947,458

UNITED STATES PATENT OFFICE 1,947,458

METHOD OF COMPOUNDING RUBBER

William S. Calcott and William A. Douglass, Penns Grove, N. J., assignors to E. I. du Pont de Nemours & Company, Wilmington, Del., a corporation of Delaware No Drawing. Application June 13, 1929
Serial No. 370,734

15 Claims. (Cl. 18—50)

This invention relates to a method of treating rubber and the resulting rubber product and is more particularly concerned with a method of treatment whereby a rubber product is obtained which is unusually resistant to deterioration and oxidation.

It is generally accepted that the rate of deterioration of rubber articles differs greatly depending on various factors such as the composition of the stock, the form of the article and the conditions under which it is used. Various materials have heretofore been incorporated in rubber stocks to inhibit deterioration. However, most of the agents heretofore employed for this purpose have been open to the objection that they discolor the rubber. For some purposes, such as white and light colored stocks it is essential that the rubber composition contain nothing which will cause discoloration of the cured stock even after exposure to direct sunlight.

The use of certain phenolic compounds to retard the deterioration of rubber has been suggested as, for example, in British Patents #181,365 and #142,083. In general, however, the phenolic compounds mentioned have a very great retarding effect upon vulcanization when the vulcanization is carried out in a press. For example, Pelizzola (Giorn. Chem. Ind. Applicata 6, (1924) 59—60) found that the addition of 1 part of pyrogallol to a mixture of 100 parts of rubber and 8 parts of sulfur increased the time required for vulcanization from 2 hours to 4 hours at 144° C. We have found that phenol, resorcinol, and hydroquinone also exert this effect of retarding the vulcanization with certain accelerators so that their use is not always practical.

The primary object of this invention therefore is to provide a method for retarding the deterioration of rubber by the use of materials which cause practically no subsequent discoloration by exposure to direct sunlight and which at the same time do not retard the cure.

With these objects in view, we have now discovered that compounds having the general formula

HO—R—R'—Y wherein R and R' represent aryl or aryl hydrocarbon radicals, the aryl nuclei of which may be directly connected by a single bond and Y represents H or OH, may be added to a rubber mix without affecting the rate of cure and that the resulting rubber when vulcanized has much greater resistance to deterioration than rubber containing no antioxidant. In addition it has been discovered that these materials cause no substantial discoloration even upon exposure to direct sunlight.

In order to disclose the invention in detail, the following examples of actual embodiments thereof are presented. It should be understood however that these examples are furnished purely for purposes of illustration and that it is not the intention that the invention be limited to the particular reagents, proportions or other conditions therein specified.

Example 1

As an example of the compounds comprising this invention, p-hydroxy diphenyl,

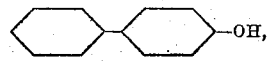

may be cited as one in which R and R¹ are aryl groups and Y is H in the general formula given above.

Two stocks were made up of the following composition; the proportions given are by weight.

| | Stock A | Stock B |
|---|---|---|
| Smoked sheets | 100 | 100 |
| Sulfur | 2.75 | 2.75 |
| ZnO | 18.15 | 18.15 |
| D.O.T.G. | 0.5625 | 0.5625 |
| p-hydroxy diphenyl | | 1.0 |

The two stocks were then cured under 40 lbs. of steam for 30 minutes. The cured samples were thereupon aged in an oxygen bomb at 70° C. under 300 lbs. of oxygen. The time required for complete deterioration of the two stocks is indicated below:

For Stock A 5 days
For Stock B 12 days

It will be noted that the resistance to deterioration of the stock containing the antioxidant was 140% greater than that of the stock containing no antioxidant.

The amount of discoloration was determined by exposure to the Fade-ometer, sun under glass, and directly to sun. The presence of p-hydroxy diphenyl caused no greater discoloration than that observed in the control.

*Example 2*

The effect on color of antioxidants of this type was also tested in the following stock of better light stability:

|  | Stock A | Stock B |
|---|---|---|
| Rubber | 100 | 100 |
| ZnO | 3 | 3 |
| Titanox | 50 | 50 |
| S | 2 | 2 |
| Tetra methyl thiuram monosulfide | 0.2 | 0.2 |
| p-hydroxy diphenyl |  | 1.0 |

Titanox is a pigment containing approximately 75% barium sulfate and 25% titanium oxide. (Gardner, "Chemical Synonyms and Trade Names", p. 250.)

The two stocks were cured at 20 lbs. steam pressure for 20 minutes. Tests for discoloration as indicated in Example 1 disclosed that the stock B containing the antioxidant showed no greater discoloration than the control stock A.

Among other members of the new group of antioxidants in which R and R' are aryl groups, Y is hydrogen, and the aryl nuclei are directly connected by a single bond, the following compounds have been actually tested and found to have antioxidant properties comparable to those of para hydroxy diphenyl.

ortho hydroxy diphenyl

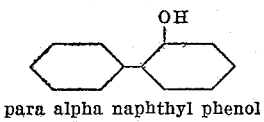

1.

para alpha naphthyl phenol

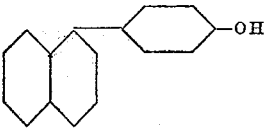

2.

para beta naphthyl phenol

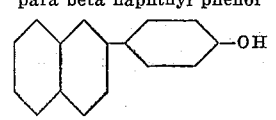

3.

The following example illustrates the use of an antioxidant of the type described in which Y is OH.

*Example 3*

A stock was made up containing 100 parts smoked sheets, 2.7 parts sulfur, 18.15 parts zinc oxide, and 0.5625 parts of diorthotolylguanidine. A second stock was made with the same proportions of materials, and to this was added 1 part of p-p'-dihydroxy-diphenyl. The two stocks were then cured under 40 lbs. of steam for 30 minutes. The cured samples were then aged in an oxygen bomb at 70° C. under 300 lb. pressure with oxygen. The stock containing no anti-oxidant had completely deteriorated in 5 days; the stock containing the 1% of dihydroxy-diphenyl lasted 15 days before complete deterioration.

The amount of discoloration was determined by exposure to the fadeometer and to sunlight, both with and without protection by glass. The stock containing the p-p'-dihydroxy-diphenyl discolored very little more than the control stock.

Among other compounds of this type where Y represents OH may be mentioned the following:
(1) Where R and R' are both phenyl nuceli 4:4'-dihydroxydiphenyl (our preferred compound)

2:2'-dihydroxydiphenyl

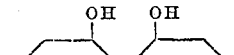

3:3'-dihydroxydiphenyl

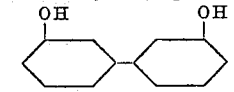

(2) Where R and R' are both naphthyl nuceli

2:2'-dihydroxy-1:1-dinaphthyl

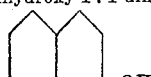

3:3'-dihydroxy-2:2'-dinaphthyl

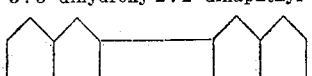

1:1'-dihydroxy-2:2'-di-naphthyl     4:4-dihydroxy-2:2'-di-naphthyl

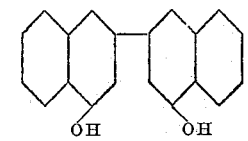

It is often advantageous to treat vulcanized rubber with reagents to improve the aging characteristics. The above group of compounds has been found to be particularly useful for this purpose. Such use is illustrated in the following example:

*Example 4*

A solution containing 6.4% of para-hydroxy-diphenyl was made by dissolving 1 part of this compound in a mixture of 1.9 parts of ethylene-glycol-monomethyl-ether and 12.8 parts of benzene. Vulcanized rubber was then prepared by curing the stock of the composition given below for 40 minutes at 40 lbs. steam pressure;

| | |
|---|---|
| Smoked sheets | 100 |
| Zinc oxide | 18.15 |
| Sulfur | 2.75 |
| Diorthotolylguanidine | 0.5625 |

Strips of this cured solution were immersed in the prepared solution described above and in ordinary commercial benzene. Another strip was untreated. After volatilization of the solvent, the two samples of rubber together with an untreated sample were aged in an oxygen bomb at 70° C. under 300 lbs. of oxygen pressure. The time required for complete deterioration is indicated below:

| | Days |
|---|---|
| Control untreated | 6 |
| Benzene treated | 7 |
| Antioxidant treated | 21 |

It will be noted that the resistance to deterioration of the stocks treated with solutions of such antioxidants is increased by more than 200% as compared to the untreated stocks.

It will be understood that the present invention embraces a large number of compounds and that many other compounds adapted for use as antioxidants could be named. The compounds mentioned hereinabove have been listed merely by way of example. It is obvious that they may contain alkyl substituents in the aryl groups which would have very little effect upon the properties of the particular compounds.

The antioxidants may be incorporated into the rubber by any well known means, such as milling them into the stock upon the rolls of an ordinary mill. Moreover, they may be employed in various rubber compounds and rubber substitutes such as, for example, gutta-percha, balata and synthetic rubber, and it is therefore to be understood that the invention is not limited to any particular rubber stock or rubber compound. Also, the proportions of the antioxidant employed may be varied within wide limits although under ordinary circumstances about 1% of the antioxidant based on the weight of the stock treated has been found to be highly satisfactory.

As many apparent and widely different embodiments of this invention may be made without departing from the spirit thereof, it is to be understood that we do not limit ourselves to the foregoing examples or description except as indicated in the following claims.

We claim:

1. The process of increasing the resistance of rubber to deterioration due to aging which comprises incorporating with the rubber an antioxidant having the general formula

HO—R—R'—OH wherein R represents a naphthyl or phenyl nucleus and R' represents a phenyl nucleus.

2. The process of claim 1 wherein, in the formula of the antioxidant employed, R represents a naphthyl group and R' represents a phenyl group.

3. The process of increasing the resistance of rubber to deterioration due to aging which comprises incorporating with the rubber an antioxidant having the general formula

4. In the art of vulcanizing rubber, the steps of mixing with the unvulcanized rubber a vulcanizing agent and an antioxidant having the general formula

HO—R—R'—OH wherein R represents a naphthyl or phenyl nucleus and R' represents a phenyl nucleus, and thereafter vulcanizing.

5. The process of claim 4 wherein, in the formula of the antioxidant employed, R represents a naphthyl group and R' represents a phenyl group.

6. The process of claim 4 wherein, in the formula of the antioxidant employed, both R and R' represent phenyl groups.

7. Rubber having incorporated therewith an antioxidant having the general formula

HO—R—R'—OH wherein R represents a naphthyl or phenyl nucleus and R' represents a phenyl nucleus.

8. Rubber having incorporated therewith an antioxidant having the general formula

HO—R—R'—OH wherein R represents a naphthyl radical and R' represents a phenyl radical.

9. Vulcanized rubber obtained by incorporating with rubber prior to vulcanization a vulcanizing agent and an antioxidant of the type set forth in claim 7.

10. Vulcanized rubber obtained by incorporating with rubber prior to vulcanization a vulcanizing agent and an antioxidant of the type set forth in claim 8.

11. The process of decreasing the deterioration of rubber due to aging, which comprises incorporating with the rubber an antioxidant having the general formula:

HO—R—R'—Y wherein R and R' represent phenyl groups and Y represents H or OH.

12. The process of decreasing the deterioration of rubber due to aging, which comprises incorporating with the rubber an antioxidant having the general formula

HO—R—R'—OH wherein R and R' both represent phenyl groups.

13. Rubber having incorporated therewith an antioxidant having the general formula

HO—R—R'—Y wherein R and R' represent phenyl groups and Y represents H or OH.

14. Rubber having incorporated therewith an antioxidant having the general formula

HO—R—R'—OH wherein R and R' both represent phenyl groups.

15. Rubber having incorporated therein an antioxidant having the general formula

WILLIAM S. CALCOTT.
WILLIAM A. DOUGLASS.